United States Patent [19]

Grab et al.

[11] Patent Number: 5,369,134
[45] Date of Patent: Nov. 29, 1994

[54] METHOD OF TREATING POLYOLEFIN PLASTIC FOAMS

[75] Inventors: Gerhard Grab, Limburgerhof; Dieter Jacob, Cadolzburg, both of Germany

[73] Assignee: Hein-Farben GmbH, Cadolzburg, Germany

[21] Appl. No.: 141,237

[22] Filed: Oct. 22, 1993

[30] Foreign Application Priority Data

Oct. 22, 1992 [DE] Germany ............................ 4235693

[51] Int. Cl.$^5$ ......................... C08J 9/224; C08J 9/232
[52] U.S. Cl. ........................................ 521/57; 427/222
[58] Field of Search ........................... 521/57; 427/222

[56] References Cited

U.S. PATENT DOCUMENTS

| | | | |
|---|---|---|---|
| 4,024,092 | 5/1977 | Sonnenberg | 521/57 |
| 4,218,511 | 8/1980 | Hahn et al. | |
| 4,980,382 | 12/1990 | Sonnenberg et al. | 521/57 |

FOREIGN PATENT DOCUMENTS

| | | |
|---|---|---|
| 0002539 | 6/1979 | European Pat. Off. |
| 50-119865 | 9/1975 | Japan. |
| 1090121 | 1/1994 | United Kingdom. |

OTHER PUBLICATIONS

Chemical Abstracts, vol. 84, No. 16, 19 Apr. 1976 abstract No. 106712h.

Primary Examiner—Morton Foelak
Attorney, Agent, or Firm—Darby & Darby

[57] ABSTRACT

Described is a method of rendering antistatic and/or rendering flame-resistant and/or coloring polyolefin particle foams, in which polyolefin particles are wetted with an organic liquid, a powder composition which contains a flame-proofing agent, an antistatic agent and/or a coloring agent as well as a film-forming agent is added with mixing and the resulting mixture is sintered in per se known manner.

15 Claims, No Drawings

METHOD OF TREATING POLYOLEFIN PLASTIC FOAMS

The present invention concerns a method of rendering antistatic and/or rendering flame-resistant and/or coloring polyolefin particle foams.

Holded or shaped parts produced from expanded polyolefins can be used in many different ways by virtue of the properties of the polyolefins. Polyolefin molded parts which comprise homopolymers or copolymers of polyolefins such as polyethylene or polypropylene can be produced from particle foam. The particle foam is generally heated with water vapor, in which case it sinters to form a molded body, with fritting of the surfaces of the particles. In order further to enlarge the range of possible uses of such materials, it is necessary to alter certain properties thereof. Thus in many areas of use it is necessary to make the molded bodies flame-resistant. When used in connection with electronic equipment, it may be necessary to prevent electrostatic charging of the surface while in many regions of use it is desirable to color the material in order that the color already indicates the kind of use.

The polyolefin particle foam which is to be processed to provide a molded part, which is usually effected with heating and the application of pressure, can admittedly already be treated in the desired manner, by way of the basic mixture used for producing it. In many cases however that is not a meaningful way of proceeding as further processing of the polyolefin particles is generally not effected at the location at which they are produced. Subsequent treatment of such particles can only be effected by the treatment agent being applied to the surface thereof. In that respect, on the one hand, the treatment must be effected in such a way that fritting of the particles in the sintering operation is not impeded. On the other hand the coating applied to the particle surfaces should not become brittle so that it splits off the particle surfaces during the further processing steps, which would result in irregular distribution of the treatment agent.

The object of the present invention is therefore that of providing a method with which polyolefin particle foams can be rendered flame-resistant, subjected to antistatic treatment and/or colored. That object is attained by a method of rendering antistatic and/or rendering flame-resistant and/or coloring polyolefin particle foams, which is characterised in that polyolefin particles are wetted with an organic liquid, a powder composition which contains a flame-proofing agent and/or an antistatic agent and/or a coloring agent as well as a film-forming agent is added with mixing and the resulting mixture is sintered in per se known manner.

Surprisingly, the method according to the invention makes it possible to coat the polyolefin particles with a layer which contains the desired agent or agents so that the polyolefin is thus treated and finished in the desired manner. That coating does not hinder the particles in sintering together so that, in spite of the treatment provided, it is possible to obtain molded bodies having the desired mechanical and physical properties.

The method according to the invention serves for the treatment of polyolefin particle foams. It can be used for homopolymers and copolymers of polyolefins such as polyethylene, polypropylene or polybutylene, or mixed polymers thereof. The method according to the invention is particularly suitable for polyethylene, polypropylene and mixed polymers thereof. The polyolefin is used in the form of a particle foam.

In the first step in the method according to the invention the polyolefin particles are wetted with an organic liquid. In that respect, the organic liquid selected is a liquid which is substantially inert relative to the polyolefin at ambient temperature so that the polyolefin particles are not attacked, dissolved or changed on their surface in an undersirable fashion. Suitable organic liquids are liquids of low volatility and of light to medium viscosity and which are preferably entirely or substantially resorbed at the temperatures of the operation of sintering the polyolefin particles. By virtue of resorption of the organic liquid the procedure gives molded bodies whose surface is not smeary or greasy. Suitable liquids are for example vegetable or animal oils, long-chain esters or ethers, aromatic esters and mineral oils such as paraffin oil. If the particle foam is to be made flame-resistant, in a preferred embodiment a part of the agent which is used for the flame-proofing effect, namely a liquid flame-proofing agent, is used as the wetting liquid. Examples in that respect are brominated aromatic hydrocarbon compounds. Particularly suitable materials are brominated phthalic acid esters such as tetrabromophthalic acid esters, of lower alcohols. The liquid flame-proofing agent can possibly be used mixed with an inert organic liquid. The organic liquid is contacted with the particles in per se known manner, for example by spraying on the liquid while the particles are being mixed in a positive-action mixer.

The organic liquid is used in such an amount that nothing more remains on the surface of the particles after the sintering operation. More appropriately the amount of organic liquid used is in the range of between 4 and 10 percent by weight with respect to the total mixture of polyolefin, organic liquid and powder composition.

After the polyolefin particles have been coated with the organic liquid, they are mixed with a composition in powder form. That powder composition contains a film-forming agent, a flame-proofing agent and/or an antistatic agent and/or a coloring agent, and optionally further additives which impart desired properties. The film-forming agent used is a substance which is solid at ambient temperature and which can be crushed to form a powder which melts at the temperatures used for sintering of the polyolefin particles and/or is dissolved in the organic liquid and which can form a continuous film. In addition, the film-forming agent should not become brittle after being applied to the surface, and it should also not have an adverse influence on the polyolefin particles. Natural and synthetic substances are suitable. It is possible for example to use natural and synthetic waxes such as stearin or polyethylene wax which melt at temperatures in the range of between 80° and 110° and thereby form a film and which can bind additives that are added at the same time. Suitable synthetic substances are in particular polymer resins such as resins based on cyclohexanone. Those resins can be partially dissolved by the organic liquid agent, which further promotes melting in the temperature range used in the sintering operation, and then form a film. The film-forming agent is used in such an amount that a continuous film can be formed on the particles. Between about 0.2 and 2 percent by weight are suitable for that purpose, with respect to the total mixture.

The film-forming agent in powder form is mixed with the particles coated with the organic liquid, together with the flame-proofing agent and/or the antistatic agent and/or the coloring agent and optionally further additives.

The flame-proofing agent in powder form is either the only flame-proofing agent used, or it is employed in combination with a liquid flame-proofing agent. Preferred is a combination of a liquid and a solid flame-proofing agent, which is particularly effective. The agents known in this area can be used as the solid flame-proofing agent. In order still further to enhance the flame-proofing action, a preferred embodiment involves the additional use of an agent producing a synergistic action with the flame-proofing agent. Antimony trioxide is preferably used as the synergist. The total proportion of flame-proofing agent, with respect to the total mixture, is in the range of between 4 and 10 percent by weight, preferably between 5 and 7 percent by weight. If both a liquid and also a solid flame-proofing agent are to be used, the ratio of liquid to solid agent, depending on the agents used, is then between about 6 and 2:1, preferably between about 3 and 5:1.

Antistatic agents can be used as further additives which alter the properties of the polyolefin. For many purposes of use, it is undesirable for the polymer surface to become statically charged. Static charging gives rise to problems more particularly in relation to electronic equipment. If therefore the polyolefin is used in such areas, it is preferably subjected to an antistatic treatment. Agents with an antistatic action are known per se and the usual agents for this purpose can be used, in the amounts which are usual for this purpose. This generally involves hydrophylic substances such as polyethylene glycol ester and amino derivatives such as for example tetraalkylammonium ethyl sulphate.

The polyolefin can also be colored with the method according to the invention. For that purpose a coloring agent is added. In that respect the coloring agent has a number of functions. On the one hand it serves as an indicator for distribution of the powder agent on the particles. Uniform distribution can be clearly gauged by reference to the uniformity of the coloring effect. In addition the coloring agent can be used to indicate the nature of the shaped or molded body. Thus a given color can be allocated to given additives. In addition it can naturally be used for aesthetic reasons. Suitable additives for the method according to the invention are the pigment dyestuffs which are known in this field. It is possible to use both organic and inorganic pigment dyestuffs which are supplied for example by BASF under the name Pigmosol or by Bayer under the name Bayferrox. The amount to be employed is in the range of between 0.01 and 5 percent by weight with respect to the particle foam used. If the particle foam is only colored, amounts of coloring agent in the lower range are used while, if flame-resistant treatment and/or antistatic treatment is or are effected at the same time, the amount of coloring agent should be in the upper range.

In accordance with the invention the polyolefin can either only be made flame-resistant or antistatic, or colored, or it can be provided with two or three of those properties at the same time.

The powder composition is mixed with the particle foam which is coated with the organic liquid, in which case the powder components are absorbed and bound by the organic liquid. That results in a particle foam which is capable of trickle flow. That particle foam is subjected to further processing in per se known manner so that the incompletely or completely expanded particles are sintered either with further expansion or without further expansion. The expression sintering of the polyolefin particles is used here to identify a step in the method in which the polyolefin particles are heated to such a temperature that their surfaces begin to melt and then frit when they cool down, whereby the particles are bound to form a shaped or molded body. Usually sintering of the particles is achieved by water vapor at a temperature in the range of between 110 and 160° C. being added to the particle foam. At that temperature the particles can possibly expand still further. At the same time, a uniform film is formed at the sintering temperature from the organic liquid and the powder composition; when using a resin, that film can be a lacquer-like coating which coats the particles and firmly bonds the flame-proofing agent and/or the antistatic agent and/or the coloring agent and optionally further additives, without having any considerable adverse effect on the physical and mechanical properties of the molded body produced.

The heating operation results at the same time in a part of the organic liquid being absorbed into the particles so that no unbound organic liquid still remains at the surface of the particles after termination of the sintering operation.

The invention provides a method with which polyolefin particles, preferably in the form of a particle foam, can be easily rendered flame-resistant and/or antistatic and/or colored. The polyolefin particles when treated in accordance with the invention provide molded bodies enjoying excellent properties.

The invention is further described by means of the following Examples.

EXAMPLE 1

100 parts (parts by weight) of a polyethylene particle foam (density 0.038 g per ml) are introduced into a positive-action mixer and 7.5 parts of paraffin oil are uniformly distributed on the surfaces of the particles, with intensive mixing. The sticky material is then powdered off with 12 parts of a mixture consisting of 70 parts of dibromopropyldione, 20 parts of antimony trioxide, 10 parts of a cyclohexanone resin (commercially available under the name Laropal ® K 80) and 1 part of coloring agent. The resulting particles which are capable of a good trickle flow can be subjected to further processing immediately or after prolonged storage. Shaped or molded parts are produced, which comply with the requirements of the flame-resistant standard UL 94 HF-1 (Underwriters Laboratories Safety Standard 94, Sections 2 and 3).

EXAMPLE 2

100 parts of a polypropylene particle foam (density 0.033 g per ml) are introduced into a positive-action mixer and 7.5 parts of a mix of paraffin oil and tetrabromophthalic acid ester are uniformly distributed on the surfaces of the particles, with intensive mixing. The sticky material is then powdered with 6 parts of a mixture consisting of 70 parts of the flame-proofing agent TBX/TBD (halogen-containing oligomeric product based on aromatic bromine compounds with an excellent flame-retardant effect, about 59 percent bromine content and about 3 percent chlorine content), 20 parts of antimony trioxide, 10 parts of a cyclohexanone resin (commercially available under the name Laropal ®

K80) and 1 part of coloring agent. The resulting particles which are capable of good trickle flow can be subjected to further processing immediately or after prolonged storage. Shaped or molded parts are obtained, which comply with the requirements of the flame-resistant standard UL 94 HF-1.

EXAMPLE 3

100 parts of a polypropylene particle foam (density 0.037 g per ml) are introduced into a positive-action mixer and 4.5 parts of tetrabromophthalic acid ester are uniformly distributed over the surfaces of the particles, with intensive mixing. After that, the sticky material is powdered with 8 parts of a material consisting of 70 parts of the flame-proofing agent TBX/TBD, 20 parts of antimony trioxide, 10 parts of film-forming agent based on cyclohexanone (Laropal ® K80) and 1 part of coloring agent. The resulting particles which are capable of good trickle flow can be subjected to further processing immediately or after prolonged storage. Shaped or molded parts are obtained, which comply with the requirements of the flame-proofing standard UL 94 HF-1.

EXAMPLE 4

100 parts of a polypropylene particle foam (density 0.037 g per ml) are introduced into a positive-action mixer and 4.5 parts of tetrabromophthalic acid ester are uniformly distributed over the surfaces of the particles, with intensive mixing. Thereupon the sticky material is powdered with 8 parts of a mixture consisting of 70 parts of the flame-proofing agent TBX/TBD, 20 parts of antimony trioxide, 10 parts of a wax film-forming agent and 1 part of coloring agent. The wax film-forming agent is a powder based on low-molecular polyethylene (viscosity of between 900 and 1550 $mm^2/sec$) which is marketed by BASF as LUVAX-A-powder. The resulting particles which are capable of good trickle flow can be subjected to further processing immediately or after prolonged storage. Shaped or molded parts are obtained, which comply with the requirements of the flame-proofing standard UL 94 HF-1.

EXAMPLE 5

100 parts of a polyethylene particle foam (density 0.029 g per ml) are introduced into a positive-action mixer and 4.5 parts of tetrabromophthalic acid ester are uniformly distributed over the surfaces of the particles, with intensive mixing. Thereafter the sticky material is powdered with 8 parts of a mixture consisting of 70 parts of the flame-proofing agent TBX-TBD, 20 parts of antimony trioxide and 10 parts of stearin. The stearin is in powder form with a maximum grain size of between 250 and 500 μm. The resulting particles which are capable of good trickle flow can be subjected to further processing immediately or after prolonged storage. Shaped or molded parts are obtained, which comply with the requirements of the flame-resistant standard UL 94 HF-1.

EXAMPLE 6

100 parts of a polypropylene particle foam (density 0.045 g per ml) are introduced into a positive-action mixer and 0.5 part of rapeseed oil is uniformly distributed over the surfaces of the particles, with intensive mixing. Thereafter the sticky material is powdered with 1 part of a mixture consisting of 60 parts of an inorganic yellow coloring pigment and 30 parts of stearin. The pigment is an iron oxide powder which is commercially available under the name 'Bayferrox'. The resulting particles which are capable of good trickle flow can be subjected to further processing to provide shaped or molded parts with good coloring, immediately or after prolonged storage.

What is claimed is:

1. A method for modifying the properties of polyolefin foam particles which comprises wetting said particles with an organic liquid, flame-proofing agent admixing the wetted particles with a powdered flame-retardent agent comprising a polyolefin additive admixed with a film forming agent; and sintering said admixture to form a shaped article.

2. The method of claim 1 wherein the polyolefin used is a particle foam of polyethylene, polypropylene or mixed polymers thereof.

3. The method of claim 1 wherein the organic liquid (contains a liquid) flame-proofing agent is admixed with an enert organic liquid.

4. The method of claim 4 wherein the liquid flame-proofing agent is a bromine-containing aromatic compound.

5. The method of claim 1 wherein the polyolefin powdered additive is antimony trioxide.

6. The method of claim 1 wherein the film-forming agent comprises between 0.2 and 2 percent by weight of the total composition.

7. The method of claim 3 wherein the flame proofing agent comprises between 4 and 10 percent by weight of the total composition.

8. The method of claim 5 wherein the ratio of liquid flame-proofing agent to powdered flame-proofing agent is between 6:1 and 2:1.

9. The method of claim 1 wherein the powder contains a coloring agent.

10. The method of claim 1 wherein the powder contains an additive for reducing the surface resistance.

11. The method of claim 1 wherein the sintering is at a temperature between 110° and 160°.

12. The method of claim 11 wherein the sintering is at a temperature between 120° and 150° and in the presence of water vapor.

13. The method of claim 1 wherein the organic liquid is between 4 and 10 percent by weight of the total composition.

14. The method of claim 1 wherein the film forming agent is a resin.

15. The method of claim 1 wherein the composition contains an antistatic agent.

* * * * *